United States Patent
Sekita

(10) Patent No.: US 10,815,914 B2
(45) Date of Patent: Oct. 27, 2020

(54) INTERNAL COMBUSTION ENGINE CONTROL DEVICE AND INTERNAL COMBUSTION ENGINE CONTROL METHOD

(71) Applicant: MAHLE Electric Drives Japan Corporation, Numazu-shi, Shizuoka (JP)

(72) Inventor: Tomoaki Sekita, Numazu (JP)

(73) Assignee: MAHLE ELECTRIC DRIVES JAPAN CORPORATION, Numazu (JP)

( * ) Notice: Subject to any disclaimer, the term of this patent is extended or adjusted under 35 U.S.C. 154(b) by 0 days.

(21) Appl. No.: 16/609,301

(22) PCT Filed: May 12, 2017

(86) PCT No.: PCT/JP2017/018023
§ 371 (c)(1),
(2) Date: Oct. 29, 2019

(87) PCT Pub. No.: WO2018/207344
PCT Pub. Date: Nov. 15, 2018

(65) Prior Publication Data
US 2020/0056554 A1    Feb. 20, 2020

(51) Int. Cl.
*F02D 29/06*    (2006.01)
*F02D 41/20*    (2006.01)
(Continued)

(52) U.S. Cl.
CPC .............. *F02D 29/06* (2013.01); *F02D 41/20* (2013.01); *F02D 45/00* (2013.01); *F02N 3/02* (2013.01); *F02N 3/04* (2013.01); *F02N 11/08* (2013.01)

(58) Field of Classification Search
CPC .......... F02D 29/06; F02D 41/20; F02D 45/00; F02D 2400/14; F02N 3/02; F02N 3/04; F02N 11/08
See application file for complete search history.

(56) References Cited

U.S. PATENT DOCUMENTS

2007/0279008 A1* 12/2007 Miura ................ H02J 7/345
320/166

FOREIGN PATENT DOCUMENTS

| JP | 2005-344651 A | 12/2005 |
|---|---|---|
| JP | 2007-192170 A | 8/2007 |

(Continued)

OTHER PUBLICATIONS

International Search Report of PCT/JP2017/018023 dated Jul. 25, 2017.

*Primary Examiner* — Xiao En Mo
(74) *Attorney, Agent, or Firm* — Mattingly & Malur, PC

(57) ABSTRACT

The control device includes a microcomputer which controls operation of the internal combustion engine, a power regulator which outputs a direct current regulated voltage regulated from electric power of the AC generator, a 5V regulator which receives an output from the power regulator and supplies it to the microcomputer; a first capacitor with a small capacity connected to an output of the power regulator, plural second capacitors connected in parallel with the first capacitor; and plural opening and closing means connected in series to the plural second capacitors, respectively. The opening and closing means are controlled to be opened and closed by the microcomputer so that the second capacitors are charged when the output of the power regulator has reached an ON voltage below the regulated voltage.

10 Claims, 10 Drawing Sheets

(51) Int. Cl.
     *F02D 45/00*     (2006.01)
     *F02N 3/02*      (2006.01)
     *F02N 3/04*      (2006.01)
     *F02N 11/08*     (2006.01)

(56) References Cited

FOREIGN PATENT DOCUMENTS

| | | |
|---|---|---|
| JP | 2010-053802 A | 3/2010 |
| JP | 2016-160817 A | 9/2016 |

* cited by examiner

INTERNAL COMBUSTION ENGINE CONTROL DEVICE AND INTERNAL COMBUSTION ENGINE CONTROL METHOD

TECHNICAL FIELD

The present invention relates to an internal combustion engine control device and a control method using same and, particularly, to an internal combustion engine control device and a control method using same which are advantageously suited for an internal combustion engine intended for a battery-less system.

BACKGROUND ART

For the sake of weight saving and easy maintenance, engines without a battery or so-called battery-less internal combustion engines are widely used in two-wheeled vehicles that are kick started and lawn mowers that are recoil started among others.

Also, even though being equipped with a battery, an internal combustion engine provided with a recoil starting starter in case the battery should become unusable because of loss of its function is used in an outboard motor or the like. In the present invention, a control device for such machines without a battery function or operable in a condition of loss of battery power will be referred to as a battery-less control device hereinafter.

For example, in the case of a battery-less internal combustion engine for use in a motorcycle, because it uses a kick starting mechanism, the crankshaft of the internal combustion engine (engine) rotates by the rider's kicking action and a generator mounted on a flywheel or the like installed on this crankshaft directly or via connecting means generates electricity.

Electric power generated by the generator is supplied to a capacitor connected via a regulator and used as a power source of a fuel injection system when the engine is rotating thereafter.

Meanwhile, in the case of a battery-less engine, for achieving secure start of the engine, it is a general practice that the capacity of the capacitor is made small so that the engine will start even with a small amount of electric power generated by initial kicking. By setting the capacity of the capacitor smaller, electric power necessary for an operating power supply for a microcomputer that the control device has can be stored in the capacitor early by one kicking action.

Nevertheless, because charged electric power is small when the capacitor with a small capacity is employed for ensuring startability early, the power supply for an engine control unit (ECU) is lost soon upon engine stop. Consequently, a microcomputer that the ECU has is deactivated and there is a risk that preprocessing for engine stop required when stopping the engine cannot be performed.

For general-purpose engines used recently, even in a case of abrupt engine stop, a microcomputer performs processing, inter alia, to record operating time until the stop and a motor stop position into a nonvolatile memory, EEPROM and the power supply for the ECU is often needed continuingly after engine stop.

In order to solve this kind of problem, PTL 1 proposes an approach that made it possible to securely perform a stop processing operation by a microcomputer even in case of abnormal engine stop, while enhancing startability of the engine.

According to PTL 1, a built-in regulator is provided which rectifies and smooths electric power generated by an AC generator mounted on an end portion of a crankshaft of an internal combustion engine directly or via a power transmission device, a first capacitor with a small capacity and a plurality of switching means are each connected in series to an output end of the built-in regulator, and a plurality of second capacitors with a capacity that is larger than the first capacitor are connected in parallel.

Furthermore, the switching means for switching the second capacitors are MOSFETs, driving the MOSFETs is controlled by a microcomputer, timing at which the microcomputer issues a command to the plurality of the switching means differs for each of the switching means and it is arranged so that switching is performed sequentially, as rotational speed of the internal combustion engine increases.

CITATION LIST

Patent Literature

PTL 1: Japanese Patent Application Laid-Open No. 2016-160817

SUMMARY OF INVENTION

Technical Problem

Explanation will be given with FIG. 11. When the engine rotational speed is N1 or below, it is regarded to fall within a low speed range and charging to the second capacitors is not performed. Moreover, when the engine rotational speed is N4 or above, again, the second capacitors are not charged. With the exception of the low speed range (N1 or below) and the high speed range (N4 or above), a medium speed range is divided into plural stages (N2, N3) and the second capacitors are charged only at divided timings indicated by line L1.

In this conventional method, in order to charge the capacitors safely, it is recommended to make a connection to and charge the capacitors at a rotational speed that is somewhat higher than a rotational speed at which a sufficient amount of electric power generation is estimated to leave room for margin.

Consequently, since a sufficient level of electric power enough to enable power supply is reached before making a connection to the capacitors for charging, it is feared that an operation of regulating electric power generated by the AC generator (a voltage regulation operation) is already performed within the regulator and surplus power arises.

This surplus power is consumed within the regulator to sustain a regulated voltage, resulting in a decrease in efficiency. That is, a configuration of a commonly used power regulator is depicted in FIG. 2 and a circuit is short-circuited by elements 221 and 222 in this regulator and, thereby, surplus power is consumed and dissipated as heat.

FIG. 12 is a diagram representing a relation between engine rotational speed, output voltage of the regulator based on the AC generator, and capacitor charging timing. The left ordinate indicates rotational speed, the right ordinate indicates voltage, and the abscissa indicates time, respectively; Vreg on the voltage ordinate indicates a voltage at which the regulator starts a regulation operation.

Line A represents a linear increase of rotational speed and line B represents rotational speed that stagnates halfway. ChA represents capacitor charging time (A1-A2) in the line A, ChB represents capacitor charging timing (B1-B2) in the line B, and Reg represents regulation operation timing in the line B, respectively.

In FIG. 12, for instance, it is supposed that rotational speed exceeds a speed corresponding to a regulated voltage Vreg (B0) and then stagnates just before reaching N1, as represented by line B. During this stagnation period (B0-B1, T2), because rotational speed does not enter the medium speed range, a state in which capacitor charging is not yet started continues, despite that a regulation operation has already started from timing B0.

If this stagnation interval (T2) becomes long, it takes forever before starting capacitor charging, whereas a regulation operation has already started (from B0), and therefore, surplus power arises and continues to be dissipated as heat, and the device efficiency decreases.

In consideration of above-noted problems of prior art, the present invention provides an internal combustion engine control device and a control method using same, enabling it to charge capacitors at high efficiency with electric power generated at engine startup to ensure power supply available for microprocessor post-processing in case of abnormal engine stop, while enhancing startability of the engine.

Solution to Problem

To solve the above-noted problems, the present invention is embodied in a battery-less internal combustion engine control device that controls the internal combustion engine with electric power generated by an AC generator mounted on an end portion of a crankshaft of the internal combustion engine directly or via a power transmission device, the control device including:

a microcomputer which controls operation of the internal combustion engine;

a power regulator which outputs a direct current regulated voltage regulated from electric power of the AC generator;

a 5V regulator which receives an output from the power regulator and supplies it to the microcomputer;

a first capacitor with a small capacity connected to an output of the power regulator;

a plurality of second capacitors connected in parallel with the first capacitor; and a plurality of opening and closing means connected in series to the plurality of second capacitors, respectively, wherein the opening and closing means are controlled to be opened and closed by the microcomputer so that the second capacitors are charged independently of rotational speed when the output of the power regulator has reached an ON voltage below the regulated voltage.

According to the above-described configuration of the invention of the present application, the second capacitors are charged at a voltage below the regulated voltage of the power regulator (before a regulation operation) and therefore, no surplus power arises in the power regulator and device efficiency can be prevented from decreasing. In addition, because the second capacitors start to be charged below the regulated voltage of the power regulator, opportunity of charging stop is reduced even though rotational speed after engine startup stagnates halfway. Moreover, earlier start of charging the second capacitors makes the time to complete the charging earlier as well.

The foregoing control device is also characterized in that, when voltage of one capacitor of the second capacitors being charged currently has reached the switching voltage, the microcomputer controls the opening and closing means to be closed to start charging of a next capacitor of the second capacitors.

According to the above-described configuration of the invention of the present application, each of the second capacitors is charged, switched sequentially below the regulated voltage; therefore, the capacitors can be charged efficiently even at a low voltage below the regulated voltage.

The foregoing control device is also characterized in that, when voltage of one capacitor of the second capacitors being charged currently has reached the switching voltage, the microcomputer controls opening and closing means connected to this capacitor to be maintained in a closed state.

According to the above-described configuration of the invention of the present application, a second capacitor after being charged completely is connected to the output of the power regulator via the opening and closing means remaining in the closed state and therefore, the second capacitor contributes to smoothing the output voltage of the power regulator.

The foregoing control device is also characterized in that the microcomputer controls the opening and closing means to be closed when the output of the power regulator becomes equal to an ON voltage below the switching voltage and controls the opening and closing means to be opened when the output of the power regulator becomes equal to an OFF voltage below the ON voltage.

According to the above-described configuration of the invention of the present application, the opening and closing means are made conductive at the ON voltage so that the second capacitors are charged and the opening and closing means are opened at the lower OFF voltage so that the second capacitors are disconnected from the output of the power regulator; therefore, the voltage of the capacitors charged at the ON voltage can be prevented from decreasing.

However, a completely charged capacitor is not controlled in the way described above, since its associated opening and closing means is maintained in the closed state. This is for ensuring that electric power can be supplied from the completely charged capacitor against sudden power loss in case of an engine stall.

The foregoing control device is also characterized in that the opening and closing means are MOSFETs and controlled to be opened and closed by the microcomputer. According to this configuration, low power consumption and miniaturization can be achieved.

To solve the above-noted problems, the present invention is also embodied in a battery-less internal combustion engine control method in which an internal combustion engine control device controls the internal combustion engine with electric power generated by an AC generator mounted on the internal combustion engine, the internal combustion engine control device including: a microcomputer which controls operation of the internal combustion engine; a power regulator which outputs a direct current regulated voltage regulated from electric power of the AC generator; a 5V regulator which receives an output from the power regulator and supplies it to the microcomputer; a first capacitor with a small capacity connected to an output of the power regulator; a plurality of second capacitors connected in parallel with the first capacitor; and a plurality of opening and closing means connected in series to the plurality of second capacitors, respectively, wherein the internal combustion engine control device controls the opening and closing means to be opened and closed by the microcomputer so that the second capacitors are charged when the output of the power regulator has reached an ON voltage below the regulated voltage.

According to the above-described configuration of the invention of the present application, the second capacitors are charged at a voltage below the regulated voltage of the power regulator (before a regulation operation) and therefore, no surplus power arises in the power regulator and device efficiency can be prevented from decreasing. In addition, because the second capacitors start to be charged below the regulated voltage of the power regulator, opportunity of charging stop is reduced even though rotational speed after engine startup stagnates halfway. Moreover, earlier start of charging the second capacitors makes the time to complete the charging earlier as well.

Advantageous Effects of Invention

According to the present invention, electric power generated by the AC generator attached to the engine is charged via the regulator to the first capacitor with a small capacitor which is always connected and also charged to a group of the second capacitors which are disconnected at startup, begin to be charged below the regulated voltage of the regulator and at or above a predetermined voltage condition, and are operated such that one determined to be completely charged remains connected until the engine control unit is reset; therefore, it is possible to charge the second capacitors at high efficiency on the basis of electric power generated at engine startup.

DESCRIPTION OF EMBODIMENTS

An example of embodiment of an internal combustion engine control device pertaining to the present invention will be described below based on FIGS. 1 to 9. Now, in the following description, an embodiment is described, taking an instance where a battery-less internal combustion engine with which a 125-cc class motorcycle is equipped is kick started and stopped. The present invention is not limited to an internal combustion engine for motorcycles and can also be applied for an internal combustion engine of a lawn mower or an outboard motor.

In the case of an outboard motor, it has a battery in general terms; however, if the battery function is lost for any reason, its engine is placed in a condition like a battery-less internal combustion engine. Therefore, also in this case, such engine is referred to as a battery-less internal combustion engine in the present invention.

Example 1

Figure 1:
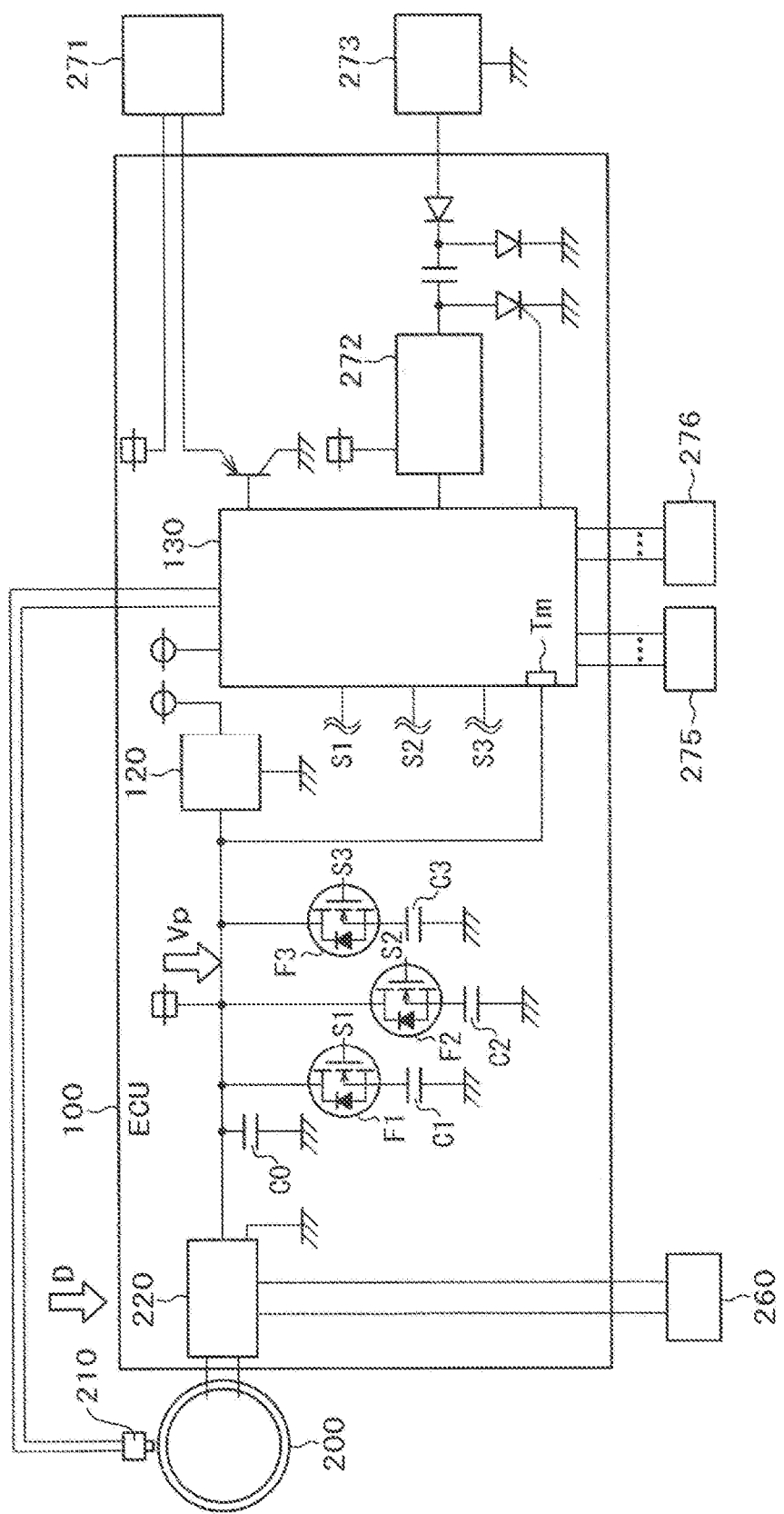
FIG. 1 is a block structural diagram of an example of embodiment of an internal combustion engine control device pertaining to the present invention.

FIG. 1 is a block structural diagram of one example of embodiment of an engine control unit (ECU) 100 with which a battery-less internal combustion engine is equipped.

In the internal combustion engine not depicted, fuel is injected from a fuel injection device between a cylinder and a piston reciprocating inside the cylinder and an ignition plug ignites the injected fuel, causing rotation of the crankshaft connected with a connecting rod coupled with the cylinder.

A flywheel is installed to one end portion of the crankshaft and reduces rotational pulsation. On the inner circumferential surface of the flywheel, permanent magnets of 4 to 12 poles are arranged such that N poles and S poles are alternated and an AC generator 200 is comprised of this permanent magnet arrangement and stator coils placed in the inner side of the flywheel magneto. Now, in the present embodiment, the AC generator 200 has four poles.

Plural stator coils are disposed in a circumferential direction and electric power is supplied from the coils via a power regulator (which is described later) to a microcomputer 130, an injector 271, and an igniting capacitor boosting circuit 272, and the power is also fed to general loads 260 including a fuel pump, an oil pump, headlights, etc.

The microcomputer 130 controls engine operation and is used for initialization processing when starting up the engine and termination processing when stopping the engine.

The ECU 100 is equipped with a power regulator 220 which rectifies and smooths electric power generated by the AC generator 200 and a 5V regulator 120 which coverts an output (a regulated voltage of about 14V) of the power regulator 220 to a specified voltage (5V) of the microcomputer 130.

Figure 2:
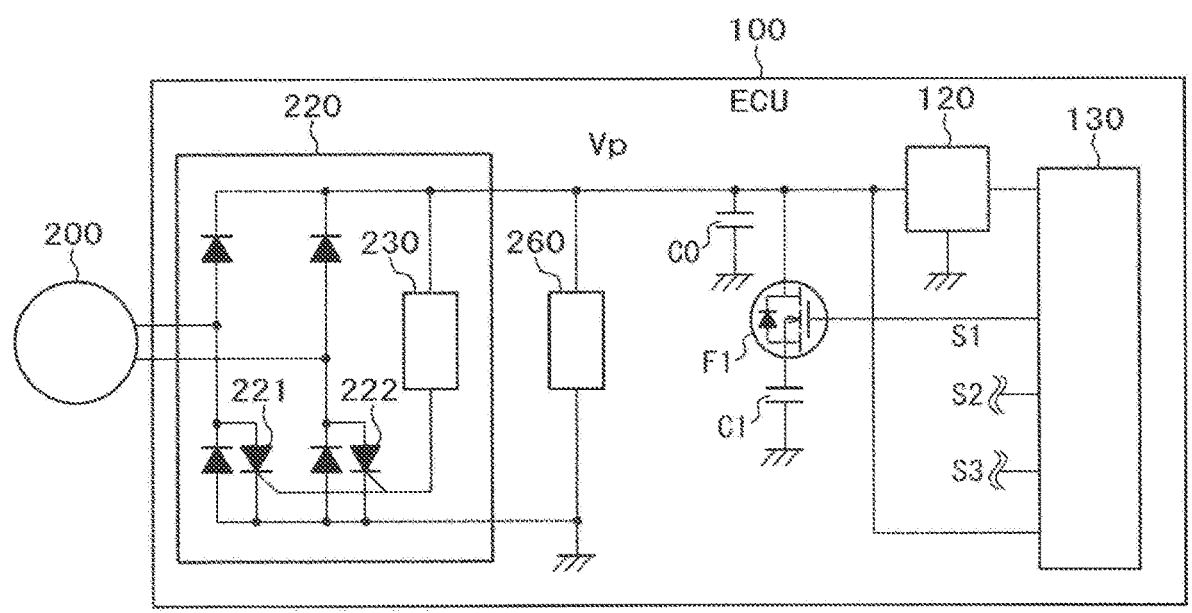
FIG. 2 is a block structural diagram mainly depicting a regulator in detail in the control device depicted in FIG. 1.

Internal circuitry of the power regulator 220 is depicted in FIG. 2. In FIG. 2, alternating current generated by the AC generator 200 is converted to direct current by full wave rectification and the direct current is smoothed and supplied to general loads 260.

To the output of the power regulator 220, inter alia, the fuel injection device 271, igniting capacitor boosting circuit 272, and general loads 260 are connected and the ECU 100 drives them directly.

An ignition coil 273 is connected to the igniting capacitor boosting circuit 272 via a capacitor among others. The ignition coil 273 generates an applied voltage for an ignition plug (not depicted).

Signals from pulse signal detection means 210 provided on the flywheel magneto to detect rotational speed are input to the ECU 100 and these signals undergo signal processing in the microcomputer 130. Also, signals from various sensors 275, 276 provided on the engine and respective parts of the body for engine control are input to the microcomputer 130.

To the output of the power regulator 220, a first capacitor C0 with a small capacity for temporarily storing the regulator output and plural second capacitors C1, C2, C3 whose capacity is larger than the first capacitor C0 are connected in parallel.

A total capacity of the second capacitors as a group has only to be larger than the capacity of the first capacitor C0; the capacity of each of the second capacitors C1, C2, C3 may be smaller than the capacity of the first capacitor C0.

Opening and closing means F1, F2, F3, each of which is a MOSFET are connected in series to the second capacitors C1, C2, C3, respectively.

The microcomputer 130 receives an output voltage of the power regulator 220 (a power supply voltage of the ECU) Vp at an input terminal Tm and outputs open/close signals (control signals) S1, S2, S3 depending on the magnitude of the output voltage Vp. The open/close signals S1, S2, S3 are supplied to the gate terminals of the opening and closing means F1, F2, F3, respectively, to control the respective opening and closing means to open/close.

In starting up the engine, the power supply of the 5V regulator 120 first rises after cranking start and initialization of the microcomputer 130 is started. Once the initialization has been completed, engine control for ignition, injection, etc. is enabled.

To improve engine startability, it is important that the power supply voltage should be early risen to 5V for the microcomputer so that the microcomputer will boot up at earlier timing and ignition and injection be executed from earlier timing.

Therefore, by setting the capacity of the first capacitor C0 smaller, it is enabled to early rise the voltage by charging with electric power generated by the AC generator 200 at startup, ensure the power supply voltage for the microcomputer 130, and complete initialization processing early.

Meanwhile, it is desirable to always record engine operating records for engine maintenance and management; however, an EEPROM for use for this recording has limitation in the number of times of writing. Practically, only when engine stop has been fixed, information on an operating history of the engine and a failure history, if any, is written to the EEPROM as termination processing.

Nevertheless, because the processing is executed, actually beginning at a starting point during transition to stop of the engine, it is feared that the microcomputer stops before completion of termination processing in the case of a battery-less internal combustion engine, since the charging capacity is smaller, when the capacity of the first capacitor C0 is smaller.

Therefore, by charging the second capacitors C1 to C3 having a larger capacity than the foregoing first capacitor C0, it is enabled to use charging power for the termination processing of the microcomputer.

However, in the prior art example, because charging the second capacitors C1 to C3 is based on rotational speed of the internal combustion engine, there are problems such as a decrease in efficiency during charging and a charging delay, which are as noted previously.

Figure 3:
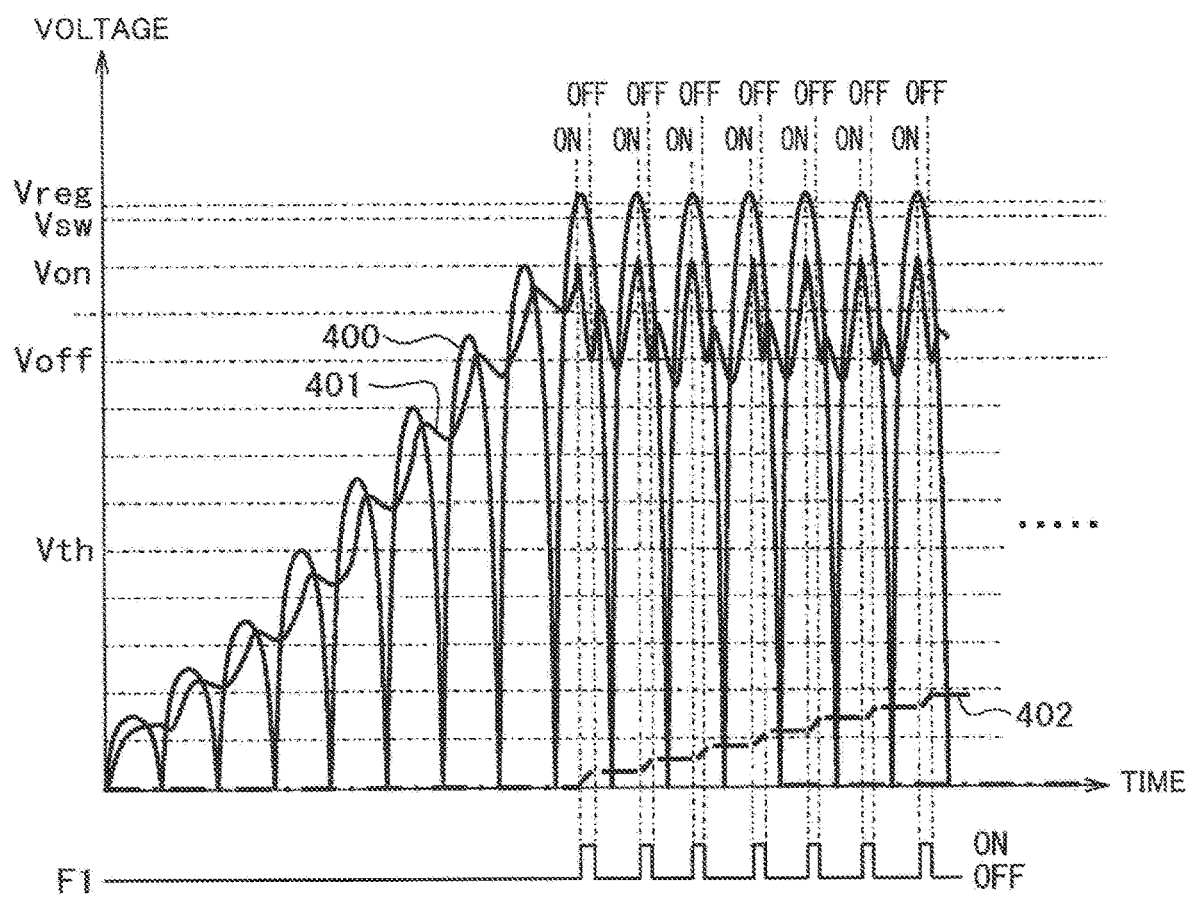
FIG. 3 is an explanatory diagram representing a part of the waveforms of voltages appearing in the respective components in FIG. 1 at engine startup.

FIG. 3 is an explanatory diagram representing a part of the waveforms of voltages appearing in the respective components in FIG. 1 at engine startup. The ordinate indicates voltage and the abscissa indicates time.

Vth on the ordinate is a voltage at which the 5V regulator 120 starts a regulation operation and it is also an operating voltage of the microcomputer 130. Vreg is a regulated voltage (about 14.5V) which is output by the power regulator 220 after being regulated by a regulation operation.

Von and Voff are a charging start voltage and a charging stop voltage, respectively, for the second capacitors C1 to C3. The charging start voltage Von is set lower than the regulated voltage Vreg and the charging stop voltage Voff is set between the charging start voltage Von and the voltage Vth.

Vsw is set between the regulated voltage Vreg and the charging start voltage Von and it is a switching voltage to switch one to be charged to another of the second capacitors C1 to C3 and set at about 13.5 V.

In FIG. 3, a voltage waveform of a curved line 400 is the waveform of a voltage in a pulsation state after a voltage generated by the AC generator 200 is rectified by full wave rectification inside the power regulator 220 and the waveform of a voltage appearing at a point (inside the power regulator 220) indicated by arrow D in FIG. 1. Because the AC generator 200 has four poles, four pulses of the voltage waveform indicated by the curved line 400 occur for one rotation of the AC generator.

A curved line 401 is a voltage waveform when the voltage in the pulsation state indicated by the curved line 400 has been smoothed by the first capacitor C0 and represents a voltage at a point indicated by arrow Vp in FIG. 1.

F1 represents the ON and OFF states of the opening and closing means F1. A voltage waveform of a curved line 402 represents a voltage waveform of the second capacitor C1 charged by closing of the opening and closing means F1 that is switched ON.

Figure 4:
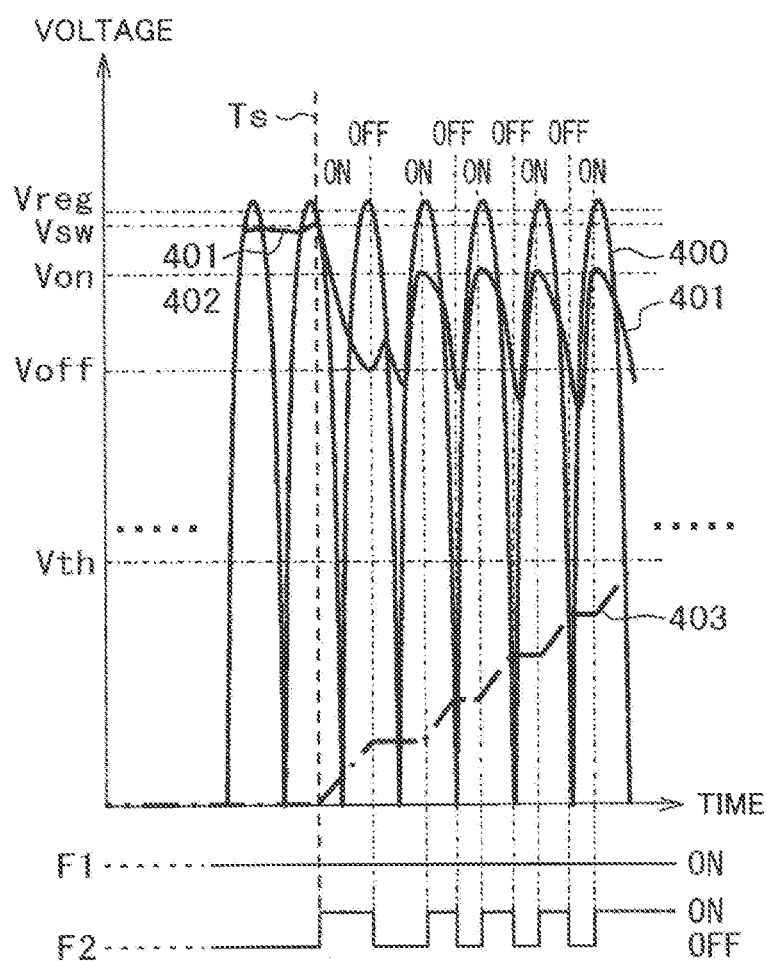
FIG. 4 is likewise an explanatory diagram representing a remaining part of extension of the time axis in FIG. 3.

FIG. 4 is an explanatory diagram of a part of extension of the time axis in FIG. 3. In FIG. 4, the curved line 402 is the voltage waveform of the second capacitor C1, continuing from FIG. 3 and rises, continuing from FIG. 3. Ts represents a switching timing when the output voltage VP has reached the switching voltage Vsw, F1 represents the continuing ON state of the opening and closing means F1, and F2 represents the ON and OFF states of the opening and closing means F2.

A curved line 403 represents the waveform of a voltage of the second capacitor C2 that rises gradually by being charged with the opening and closing means F2 being switched ON and OFF.

Figure 5:
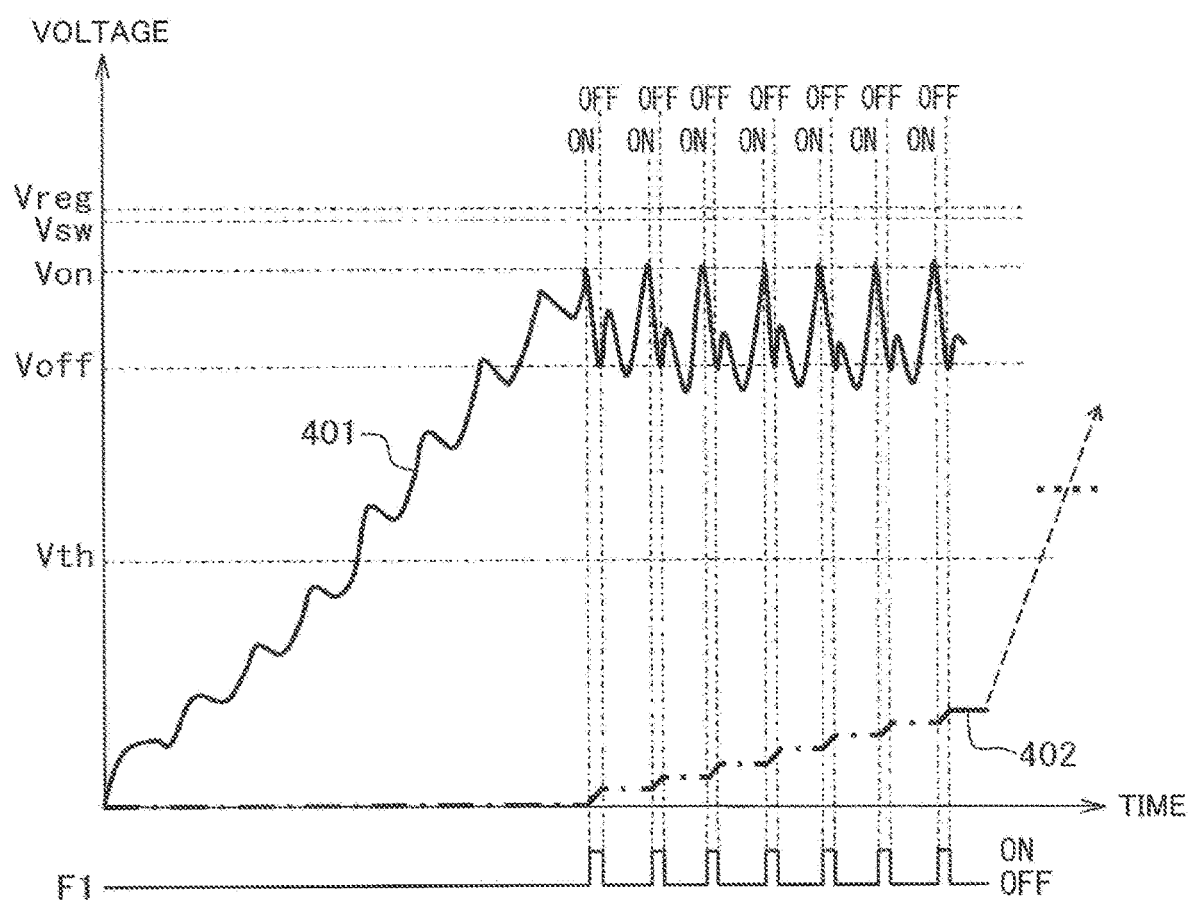
FIG. 5 is an explanatory diagram representing a part of the regulator output voltage and second capacitor voltage waveforms in FIG. 3.

FIG. 5 is an explanatory diagram representing a part of the power regulator output voltage and second capacitor voltage waveform in FIG. 3 and, in this representation, the voltage waveform represented by the curved line 400 is removed from FIG. 3 to make the diagram easy to understand.

Figure 6:
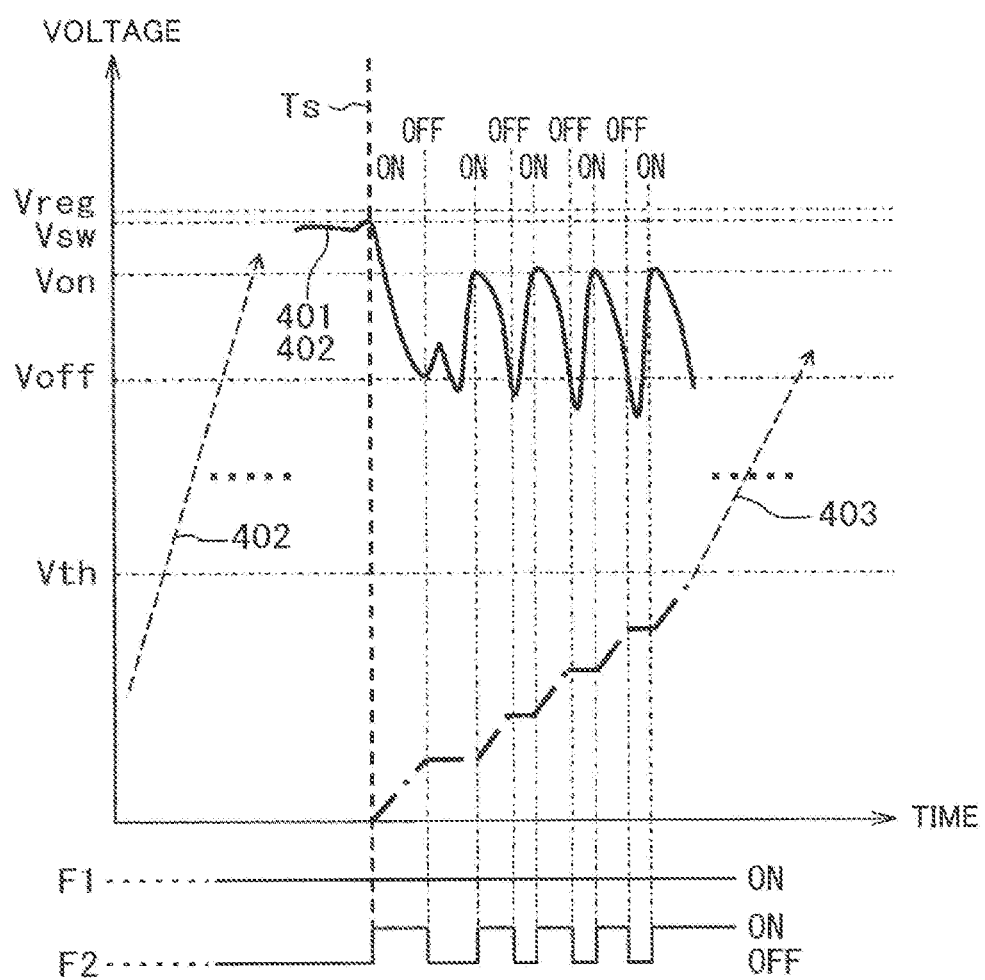
FIG. 6 is likewise an explanatory diagram representing a remaining part of extension of the time axis in FIG. 5.

FIG. 6 is an explanatory diagram representing a remaining part of extension of the time axis in FIG. 5. In this representation, the curved line 400 is removed from FIG. 5.

Figure 7:
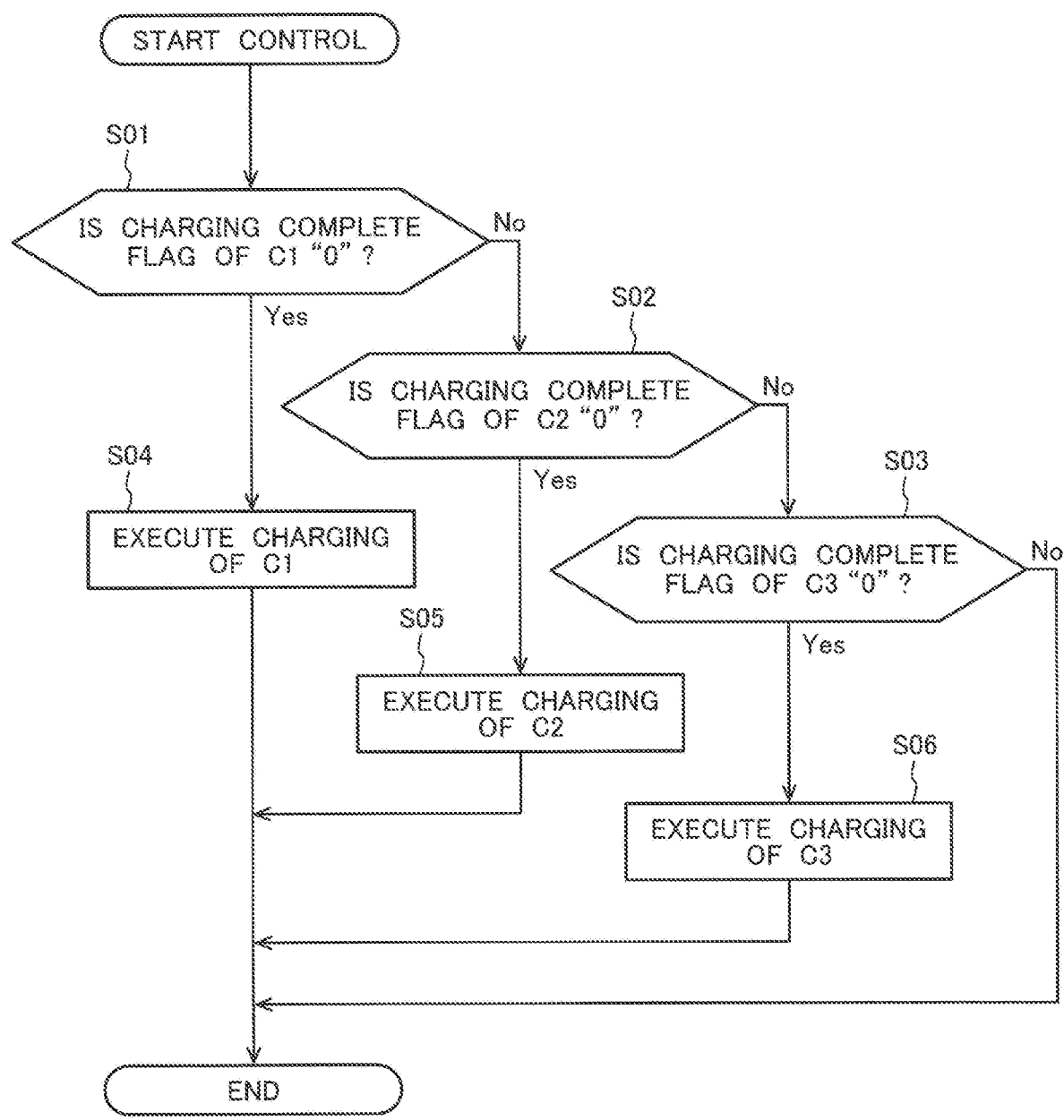
FIG. 7 is a flow diagram of control of charging the second capacitors in the internal combustion engine control device depicted in FIG. 1.
Figure 8:
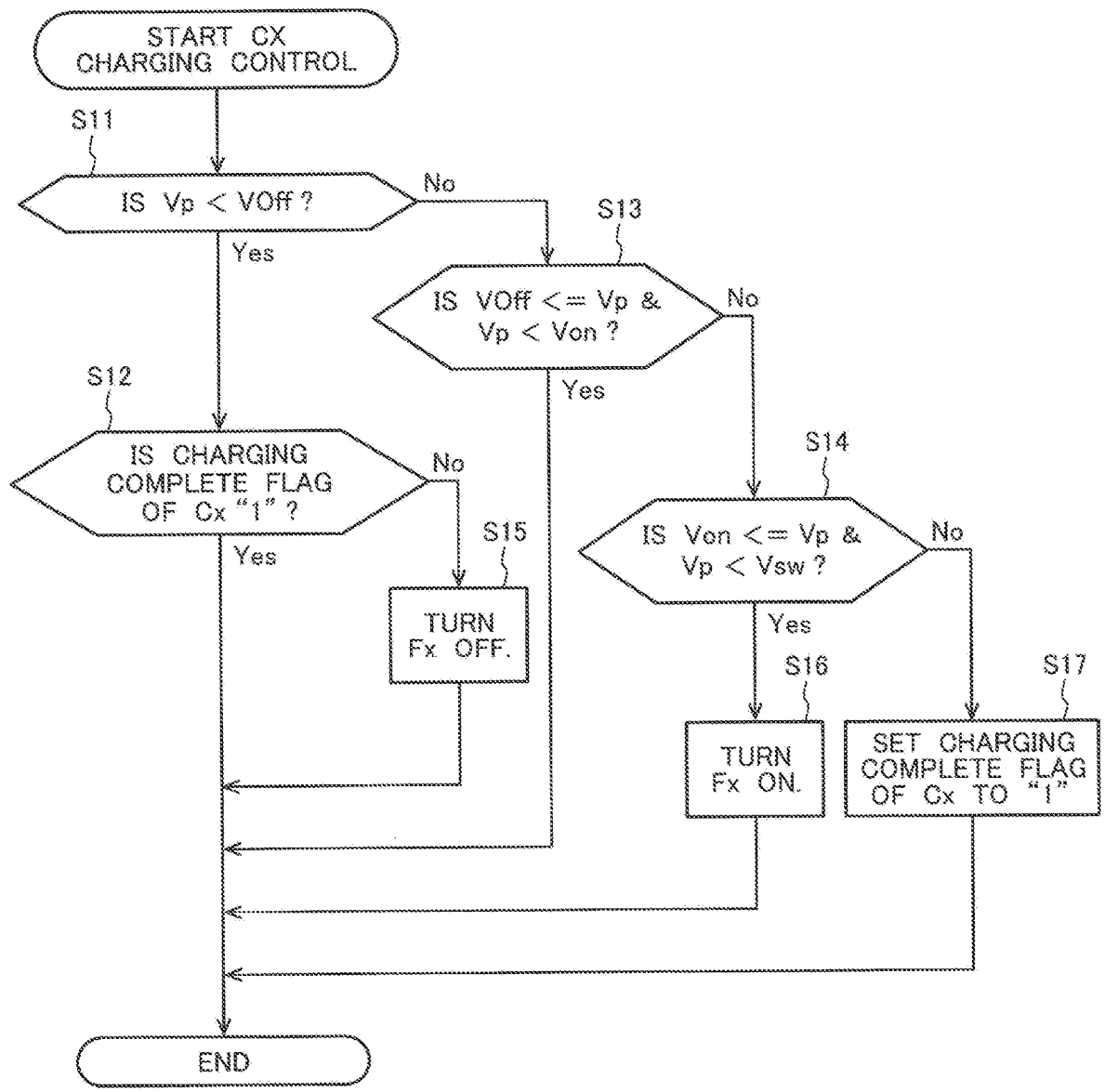
FIG. 8 is a flow diagram of open/close control of the opening and closing means in the internal combustion engine control device depicted in FIG. 1.

FIG. 7 is a flow diagram of control of charging the second capacitors C1 to C3 in the engine control unit 100 depicted in FIG. 1. FIG. 8 illustrates a detailed charging control flow in the steps of charging the respective capacitors in FIG. 7. Both flows always operate concurrently.

The following describes operation of charging the second capacitors C1 to C3, which is a feature of the present invention, with the aid of FIGS. 3 to 8.

In FIG. 7, when control is started, first, it is determined whether or not a charging complete flag of the second capacitor C1 is "0" (charging is not complete) at step S201. If a result of the determination is Yes (charging of the second capacitor C1 is not complete), charging of the second capacitor C1 is executed at step S04. This charging operation will be described later with FIG. 8.

If a result of the determination at the step S201 is No (charging is complete), a transition is made to step S02 and it is determined whether or not a charging complete flag of the second capacitor C2 is "0".

If the determination at the step S02 is Yes (charging of the second capacitor C2 is not complete), charging of the second capacitor C2 is executed at step S05. This charging operation will be described later with FIG. 8.

If the determination at the step S02 is No (charging is complete), a transition is made to step S03 and it is determined whether or not a charging complete flag of the third capacitor C3 is "0".

If the determination at the step S03 is Yes (charging of the second capacitor C3 is not complete), charging of the second capacitor C3 is executed at step S06. This charging operation will be described later with FIG. 8.

If the determination at the step S03 is No (charging is complete), the flow is terminated and returns to a state of control start.

A flow of control of charging the respective capacitors in the steps 204, 205, 206 is commonly illustrated in the control flow in FIG. 8. CX in FIG. 8 is representative of C1 to C3.

First, charging of the second capacitor C1 is described. When control of charging the second capacitor C1 is started, comparison is made between the output voltage Vp of the power regulator 220 and the charging stop voltage Voff at step S11.

When a result of the compassion is Vp<Voff, a transition is made to step S12 and it is determined whether or not the charging complete flag of the second capacitor C1 is "1" (charging of C1 is complete).

If the determination at step S12 is Yes (charging of C1 is complete), the flow is terminated without doing anything, and returns to the start of CX charging control. If the determination at step S12 is No (charging of C1 is not complete), the opening and closing means F1 is maintained in the OFF state at step S15 and the second capacitor C1 is not charged.

Operations in each of the above steps are described with FIG. 3 and FIG. 5. When the engine starts to rotate by kick start, the output voltage VP is positioned at a voltage lower than the charging stop voltage Voff in the above steps S11, S12, S15, as indicated by the curved line 401.

When the determination at the above step S11 is No (Voff≤Vp), a transition is made to step 13 and it is determined whether or not Voff≤Vp and Vp<Von.

When the determination at the above step S13 is Yes, the flow is terminated, doing nothing, and returns to the start of CX charging control. This state is such that the output voltage VP is positioned between the charging stop voltage Voff and the charging start voltage Von, as indicated by the curved line 401 in FIG. 3 and FIG. 5.

When the determination at the above step S13 becomes No, a transition is made to step 14 and it is determined whether or not Voff≤Vp and Vp<Vsw. When the determination at step S14 becomes Yes, the opening and closing means F1 is switched to the ON state at step S16 and the second capacitor C1 is charged through the opening and closing means F1.

This is illustrated in FIG. 3 and FIG. 5 as below: the output voltage VP represented by the curved line 401 has reached the charging start voltage Von and the opening and closing means F1 is placed in the ON state. When the second capacitor C1 is charged, due to a current for charging it, the output voltage VP descends greatly in timing with a fall of pulsation produced by full wave rectification, represented by the curved line 400 (FIG. 3), and falls down to the charging stop voltage Voff.

When the output voltage VP falls down to Voff, the opening and closing means F1 is controlled to turn Off at step S15 after going through steps S11, S12 in FIG. 8 and charging of the second capacitor C1 is stopped. By this turn-Off control, the opening and closing means F1 is shut off and the charged second capacitor C1 is prevented from discharging, thus preventing a decrease in voltage.

The output voltage Vp ascends again in timing with a rise of pulsation produced by full wave rectification, represented by the curved line 400 in FIG. 3, since the charging current disappears upon the stop of charging of the second capacitor C1.

When the output voltage Vp ascends and rises to Von, the second capacitor C1 is charged again and such charging and stop are performed repeatedly. By thus repeating the charging, the voltage of the second capacitor C1 ascends gradually, as represented by the curved line 402 in FIG. 3 and FIG. 5.

The voltage of the second capacitor C1 continues to ascend by repetitive charging, gradually approaches the output voltage VP, as represented by the curved line 402, and reaches nearly the same level as the output voltage VP just before reaching the switching voltage Vsw at which charging is complete.

In this state, charging of the second capacitor C1 is complete and therefore, the determination at the step S14 in FIG. 8 becomes No and the charging complete flag is set to "1" at step S17.

Then, at switching timing Ts when the output voltage VP has reached the switching voltage Vsw, the opening and closing means F2 is controlled to turn On and charging of the next second capacitor C2 starts, as represented in FIG. 4 and FIG. 6.

To illustrate in the operation flow, when the charging complete flag is set to "1" at step S17, a result of the determination at step S01 in FIG. 7 becomes No and a transition is made to step S02 and then, the second capacitor C2 is charged at step S05.

Now, the opening and closing means F1 is maintained in the ON state even after the switching timing Ts and the voltage of the second capacitor C1 stays at the same voltage as Vp; thus, the voltage of the second capacitor C1 that has already been charged is prevented from decreasing.

As represented in FIG. 4 and FIG. 6, when the opening and closing means F2 turns ON at the switching timing Ts and charging of the second capacitor C2 starts, the output voltage descends due to a current for the charging and a fall of pulsation produced by full wave rectification, represented by the curved line 400, and falls down to the charging stop voltage Voff.

When the output voltage Vp thus changes due to charging of the second capacitor C2, the opening and closing means F2 repeats turning ON and OFF at Von and Voff and the second capacitor C2 is charged intermittently. Along with this, the voltage of the second capacitor C2 gradually ascends, as represented by the curved line 403.

By charging the second capacitor C2 intermittently, the curved line 403 ascends in the same manner as the curved line 402.

When the voltage of the second capacitor C2 has reached Vsw, the determination at step S14 in FIG. 8 becomes No. In this state, charging of the second capacitor C2 is complete and therefore, the charging complete flag is set to "1" at step S17.

Although subsequent operation is not illustrated in FIG. 4 and FIG. 6, the voltage of the second capacitor C2 reaches nearly the same level as the output voltage VP and reaches the switching voltage Vsw; therefore, charging of the next second capacitor C3 is started.

To illustrate in the operation flow, when the charging complete flag of the second capacitor C2 is set to "1" at step S17, a result of the determination at step S02 in FIG. 7 becomes No and a transition is made to step S03 and then, the second capacitor C3 is charged at step S06.

The curved line 401 of the output voltage VP rises and falls in a saw tooth appearance having a sharp shape, as represented in FIG. 5, when the second capacitor C1 is charged intermittently; whereas, it rises and falls in a loose shape, as represented in FIG. 6, when the second capacitor C2 is charged intermittently. This is because the second capacitor C1 that has already been charged serves a smoothing function when the second capacitor C2 is charged.

The second capacitors C1 to C3 are sequentially charged in the way described above and, after completion of the charging, the opening and closing means F1 to F3 are maintained in the ON state. The voltages of the second capacitors C1 to C3 stay at the same level as the output voltage VP and the voltages of the charged capacitors can be prevented from decreasing.

The charged second capacitors C1 to C3 have sufficient electric energy and the opening and closing means F1 to F3 are maintained in the ON state; therefore, even if the engine abnormally stops suddenly at a later time, it is possible to supply sufficient electric power to the 5V regulator 120 from the second capacitors C1 to C3 via the opening and closing means F1 to F3 and therefore, the termination processing by the microcomputer 130 can be performed certainly.

Time it takes to charge the second capacitors C1 to C3 is described. With regard to pulses of the curved line 400 in FIG. 3, when rotation is started by kicking the pedal, the speed of the AC generator 200, as compared with the initial rotation, the speed of subsequent rotations becomes higher because of rotational inertia.

Hence, assuming that the duration of the first four pulses occurring for a first cycle of rotation of the AC generator 200 is 0.5 seconds, the duration of four pulses for a second cycle of rotation will be 0.3 seconds and the duration of four pulses for a third cycle of rotation will be 0.1 seconds; the duration becomes shorter gradually and it takes several seconds to several tens of seconds until termination of charging of all the second capacitors (C1 to C3).

After that, the output voltage VP represented by the curved line 401 ascends with an increase in the rotational speed of the engine and reaches the regulated voltage Vreg. Once the output voltage VP has reached the regulated voltage Vreg, the power regulator 220 starts the regulation operation and its output voltage VP is maintained at Vreg.

As described above, because charging of the second capacitors C1 to C3 is complete before the output voltage VP reaches the regulated voltage Vreg, the power regulator 220 does not start the regulation operation during the charging.

Hence, during the charging of the second capacitors, there is no possibility of trouble such as a decrease in efficiency due to heat generation attributed to the regulation operation by the power regulator 220 and delay of charging of the second capacitors.

Figure 9:
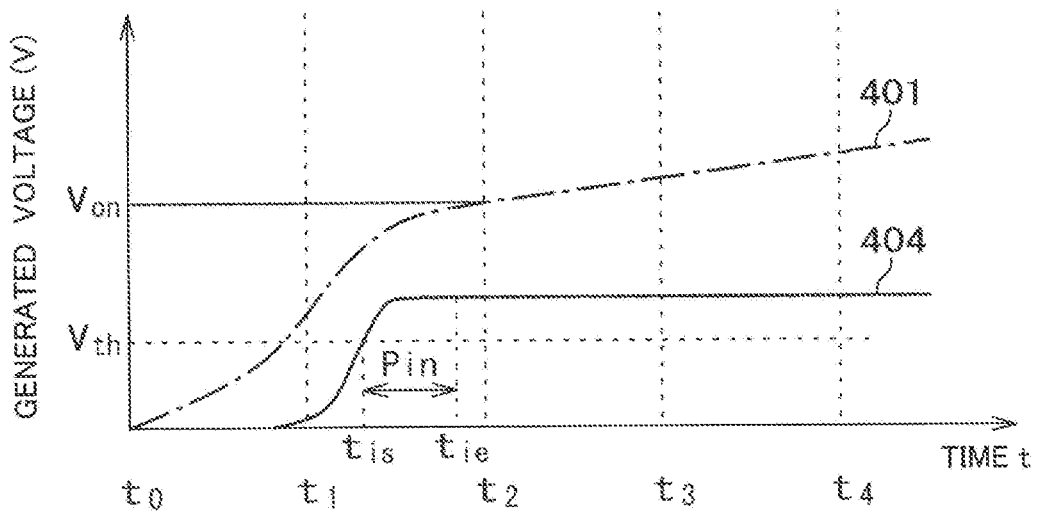
FIG. 9 is an explanatory diagram representing changing over time of the voltages of the power regulator and 5V regulator at engine startup in the present example of embodiment.
Figure 10:
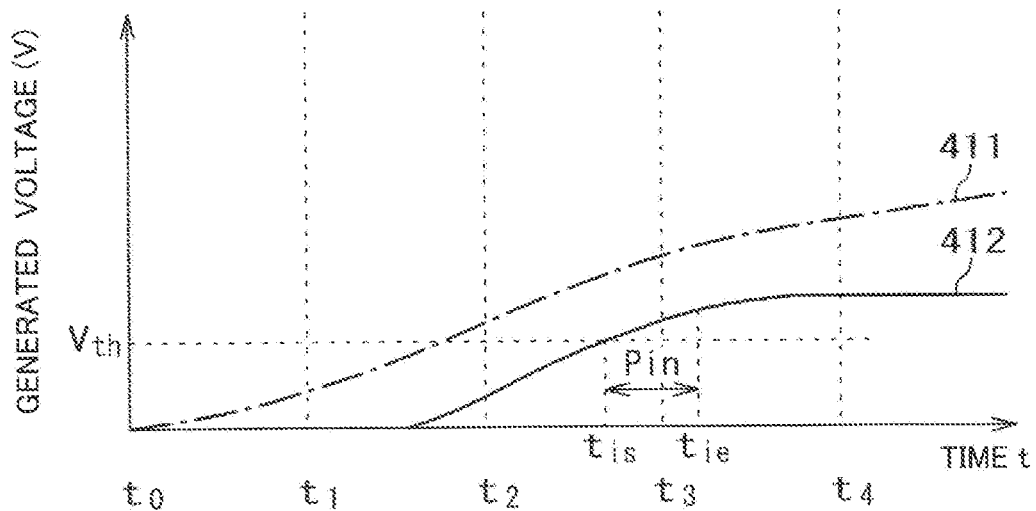
FIG. 10 is an explanatory diagram of a comparison example against FIG. 9.
Figure 11:
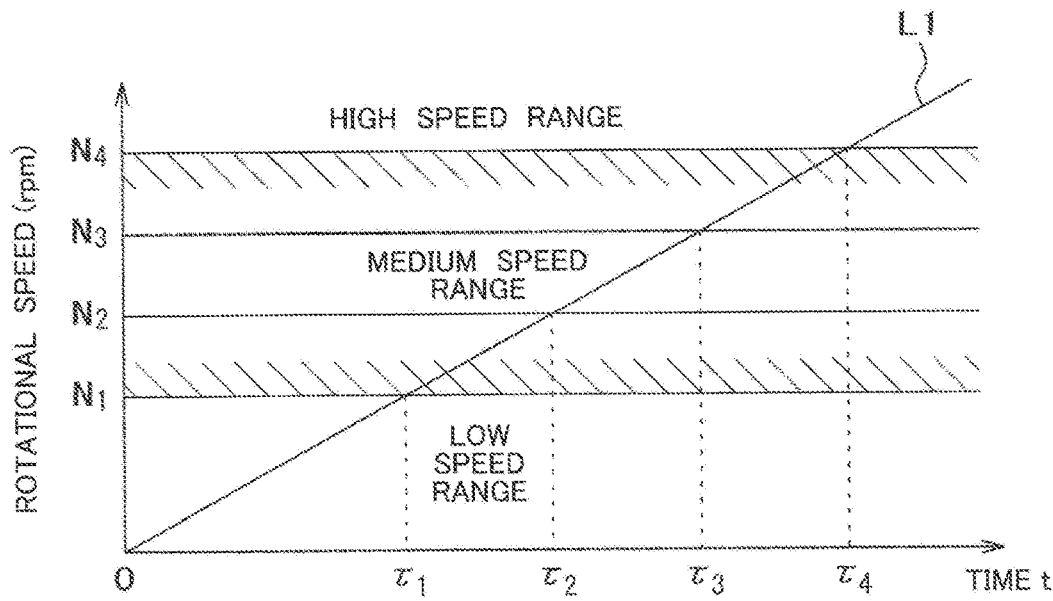
FIG. 11 is an explanatory diagram of capacitor charging timing in prior art.
Figure 12:
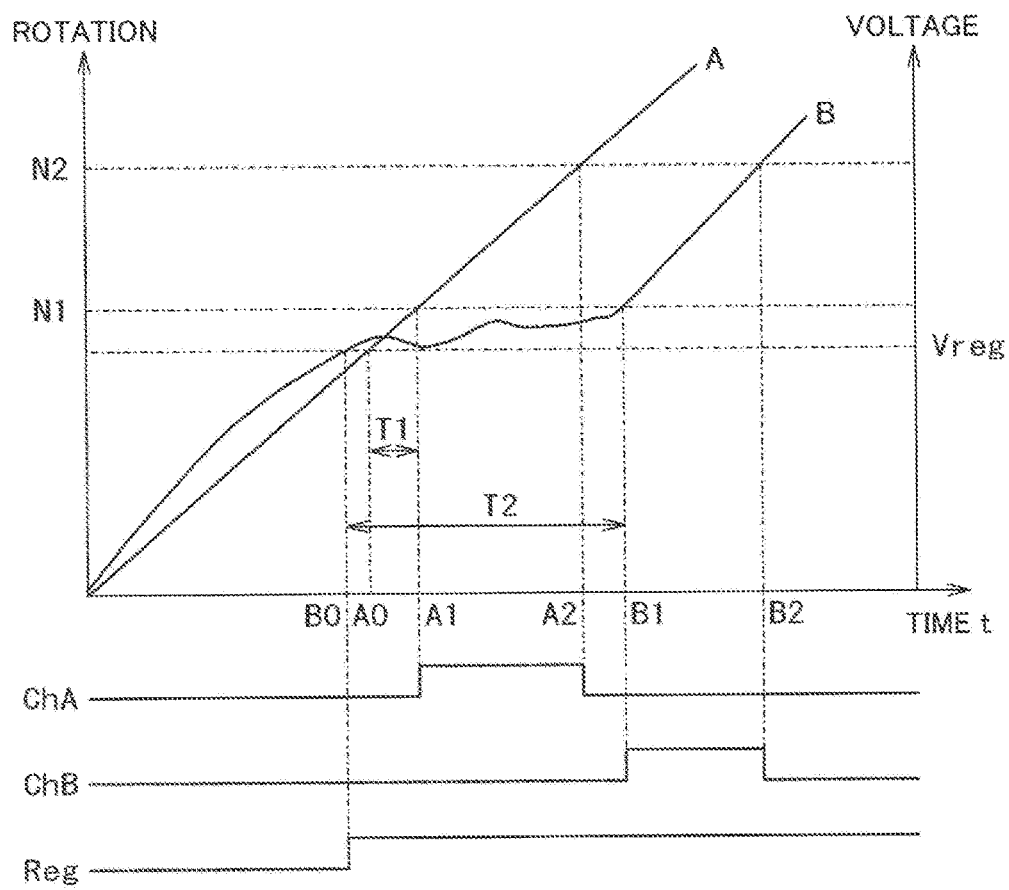
FIG. 12 is an explanatory diagram of capacitor charging timing according to how engine rotational speed increases.

FIG. 9 and FIG. 10 represent changing over time of output voltage VP that is output from the power regulator 220 for power supply to the engine control unit ECU 100 and voltage that is output from the 5V regulator 120 for power supply to the microcomputer 130.

FIG. 9 is a graph according to the present embodiment and FIG. 10 is change over time pertaining to a comparison example. When kicking is started by kicking the pedal at time t0, the output voltage VP for power supply to the engine control unit 100, represented by a dash-dot curved line 401, starts to ascend and eventually rises to about 14V.

While the voltage ascends, when the output voltage VP exceeds a threshold voltage Vth around time t1 corresponding to time of one rotation of the AC generator 200 in which the cylinder has reciprocated, the output of the 5V regulator 120 starts to ascend.

The output voltage of the 5V regulator 120 exceeds Vth at time tis during a time course to time t2 to complete a second cycle of rotation of the AC generator 200 and subsequently, the regulator outputs a stabilized voltage (above Vth).

The microcomputer 130 starts initialization processing at time tis and terminates the initialization processing at time tie before the completion (time t2) of the second cycle of rotation of the AC generator 200.

Hence, it is possible to make an ignition operation (first explosion) of the engine take place early near to the time t2 to complete the second cycle of rotation of the AC generator 200 by controlling the engine by the microcomputer.

The output voltage VP continues to ascend and, upon reaching the charging start voltage Von following the time t2 to complete the second cycle of rotation of the AC generator 200 (following eight pulses in the curved line 400 in FIG. 3), a control signal S01 is output from the microcomputer 130.

The opening and closing means F1 is closed to be conductive by the control signal S01 and charging of the second capacitor C1 is performed. After that, the second capacitors C2, C3 are charged sequentially in the same way as for control of charging the second capacitor C1 described previously.

Because charging of these second capacitors is complete before the output voltage VP reaches the regulated voltage Vreg, the power regulator 220 does not start the regulation operation during the charging.

Hence, during the charging of the second capacitors, there is no possibility of trouble such as a decrease in efficiency due to heat generation and delay of charging of the second capacitors. Additionally, because charging can be accomplished at early timing and a low voltage below the regulated voltage Vreg, operation can be performed promptly and efficiently.

In contrast, in the comparison example in which a capacitor with a large capacity is used as the first capacitor C0, charging of the first capacitor requires time and therefore, ascending of the output voltage VP of a curved line 411 is slow and also, the output of the 5V regulator (curved line 412) does not reach the operating voltage Vth of the microcomputer 130 by t1 and t2 to complete the first and second cycles of rotation.

Then, the output of the foregoing 5V regulator finally reaches the voltage Vth between time t2 to complete the second cycle of rotation of the AC generator 200 and t3 to complete a third cycle of rotation and initialization processing can be started.

Moreover, because processing time Pin is required for initialization processing, time to terminate the initialization processing for the microcomputer 130 comes later than time t3 to complete the third cycle of rotation of the AC generator 200.

In the meantime, because the output voltage VP continues to ascend subsequently but rises slowly, it takes long before reaching the charging start voltage Von and a situation arises where timing of charging the second capacitors is delayed.

Delayed charging timing may result in a case where the second capacitors are not charged to a sufficient amount of charge, and it is feared that termination processing by the microcomputer 130 will not be completed in case of abnormal stop of the engine that may happen suddenly at a later time.

In contrast, in the invention of the present application, electric power generated by the AC generator attached to the engine is charged via the regulator to the first capacitor with a small capacitor which is always connected and also charged to the second capacitors which are disconnected at startup, begin to be charged at or above a predetermined voltage below the regulated voltage of the regulator, and remain connected until the engine control unit is reset; therefore, it is possible to charge the second capacitors at high efficiency on the basis of electric power generated at engine startup.

REFERENCE SIGNS LIST

100: engine control unit (ECU), 210: 5V regulator,
130: microcomputer, 200: AC generator,
210: pulse signal detection means, 220: power regulator
221, 222: elements, 230: microcomputer, 260: general loads
271: fuel injection device, 271: injector,
272: igniting capacitor boosting circuit, 273: ignition coil,
275, 276: various sensors, 400: voltage waveform after full wave rectification, curved line,
401: smoothed voltage waveform, curved line,
402, 403: voltage waveform of second capacitor, curved line,
C0: first capacitor, C1, C2, C3: second capacitors,
F1, F2, F3: opening and closing means, S1, S2, S3: open/close signals,
Tm: input terminal, Ts: switching timing,
Vp: output voltage of the power regulator, output voltage, arrow,
Vth: operating voltage of microcomputer, Voff: charging stop voltage,
Von: charging start voltage, Vsw: switching voltage, Vreg: regulated voltage

The invention claimed is:

1. An internal combustion engine control device that controls a battery-less internal combustion engine with electric power generated by an AC generator mounted on an end portion of a crankshaft of the internal combustion engine directly or via a power transmission device, comprising:
a microcomputer which controls operation of the internal combustion engine;
a power regulator which outputs a direct current regulated voltage regulated from electric power of the AC generator;
a 5V regulator which receives an output from the power regulator and supplies it to the microcomputer;
a first capacitor with a small capacity connected to an output of the power regulator;
a plurality of second capacitors connected in parallel with the first capacitor; and
a plurality of opening and closing means connected in series to the plurality of second capacitors, respectively, wherein the opening and closing means are controlled to be opened and closed by the microcomputer so that the second capacitors are charged when the output of the power regulator has reached an ON voltage below the regulated voltage.

2. The internal combustion engine control device according to claim 1, wherein, when voltage of one capacitor of the second capacitors being charged currently has reached a switching voltage below the regulated voltage, the microcomputer controls the opening and closing means to be closed to start charging of a next capacitor of the second capacitors.

3. The internal combustion engine control device according to claim 2, wherein, when voltage of one capacitor of the second capacitors being charged currently has reached the switching voltage, the microcomputer controls opening and closing means connected to this capacitor to be maintained in a closed state.

4. The internal combustion engine control device according to claim 2, wherein the microcomputer controls the opening and closing means to be closed when the output of the power regulator becomes equal to an ON voltage below the switching voltage and controls the opening and closing means to be opened when the output of the power regulator becomes equal to an OFF voltage below the ON voltage.

5. The internal combustion engine control device according to claim 1, wherein the opening and closing means are MOSFETs and controlled to be opened and closed by the microcomputer.

6. An internal combustion engine control method in which an internal combustion engine control device controls a battery-less internal combustion engine with electric power generated by an AC generator mounted on the internal combustion engine,
wherein the internal combustion engine control device includes a microcomputer which controls operation of the internal combustion engine; a power regulator which outputs a direct current regulated voltage regulated from electric power of the AC generator; a 5V regulator which receives an output from the power regulator and supplies it to the microcomputer; a first capacitor with a small capacity connected to an output of the power regulator; a plurality of second capacitors connected in parallel with the first capacitor; and a plurality of opening and closing means connected in series to the plurality of second capacitors, respectively,
wherein the internal combustion engine control device controls the opening and closing means to be opened and closed by the microcomputer so that the second capacitors are charged when the output of the power regulator has reached an ON voltage below the regulated voltage.

7. The internal combustion engine control method according to claim 6, wherein, when voltage of one capacitor of the second capacitors being charged currently has reached a switching voltage below the regulated voltage, the microcomputer controls opening and closing means connected to this capacitor to be maintained in a closed state.

8. The internal combustion engine control method according to claim 7, wherein, when voltage of one capacitor of the second capacitors being charged currently has reached the switching voltage, the microcomputer controls opening and closing means connected to this capacitor to be maintained in a closed state.

9. The internal combustion engine control device according to claim 7, wherein the microcomputer controls the opening and closing means to be closed when the output of the power regulator becomes equal to an ON voltage below the switching voltage and controls the opening and closing means to be opened when the output of the power regulator becomes equal to an OFF voltage below the ON voltage.

10. The internal combustion engine control device according to claim 6, wherein the opening and closing means are MOSFETs and controlled to be opened and closed by the microcomputer.

\* \* \* \* \*